UNITED STATES PATENT OFFICE.

LEOPOLD ISIDORE NEUMANN NORMAN, OF LONDON, ENGLAND.

MANUFACTURE OF BREWING SIRUP.

SPECIFICATION forming part of Letters Patent No. 540,331, dated June 4, 1895.

Application filed January 21, 1895. Serial No. 535,723. (No specimens.) Patented in England September 18, 1894, No. 17,744.

*To all whom it may concern:*

Be it known that I, LEOPOLD ISIDORE NEUMANN NORMAN, a subject of the Queen of Great Britain and Ireland, and a resident of 3 East India Avenue, in the city of London, England, have invented certain new and useful Improvements in the Manufacture of Brewing Sirups, (Patented in Great Britain, No. 17,744, dated September 18, 1894,) of which the following is a specification.

This invention has for its object the manufacture of a brewing sirup which shall combine the favorable features of an invert sugar with those of a sugar derived from starch. Such sirup should contain but little, if any, cane sugar or gallisin (a non-fermentable material); should be as free as practicable from mineral matters. The proportion of albumen and other organic impurities should be small; but it should contain a sufficient proportion of dextrine.

By this invention the useful constituents of the two sugars above mentioned are not only united in the product so as to be useful to the brewer, but during the process of union the non-fermentable gallisin and other objectionable impurities present are removed and a brewing sirup is produced containing directly and non-directly fermentable carbohydrates (dextrine) the ratio of which can be regulated at will. As a result the brewer has to hand a sirup which permits his obtaining a "full" tasting beer, but at the same time one which will sufficiently attenuate.

In order to fulfill the conditions above set forth, it is necessary, as already stated, that the product should contain a notable proportion of dextrine, a carbo-hydrate which, as is well known, is absent in cane sugar. As the result of experiment I have found that solid starch sugars do not contain a sufficiency of dextrine and therefore I prefer to use a liquid starch sugar of say 44° Baumé. Such liquid sugars do, however, contain notable quantities of the material known as gallisin which I find it most desirable to remove.

It is advisable that the proportion of dextrine in the finished sirup of 44° Baumé should be as nearly as practicable about fifteen per cent. and in order to insure the presence of this amount it is necessary that the starch sugar to be employed should be carefully selected by analysis.

I find as the result of experiment that the best commercial starch sugar sirups contain organic and inorganic impurities of which gallisin may be quoted as an example of the former, which yield to treatment by animal charcoal and by acid, gallisin as is well known, being converted by treatment with acid into fermentable dextrose. I therefore proceed as follows:

I mix suitable proportions of liquid starch sugar sirup previously selected as above described and good raw sugar such as penang or sorghum, maple or other suitable sirup containing crystallizable sugar. I find that the best sirup is obtained by mixing two-thirds by weight, of a suitable liquid starch sugar sirup, and one third by weight of a suitable sirup containing crystallizable sugar. I melt the mixture and add a sufficiency of water to enable it to filter easily through charcoal. This filtration I repeat two or more times if necessary, until examination shows the maximum of practicable decoloration. To the purified mixed sirup thus obtained, I add sufficient sulphuric acid of the usual strength to invert the cane sugar present, and I add a small excess of acid and invert slightly longer than usual so as to convert the gallisin into dextrose as above set forth. Having completed the inversion and purification as above described, I proceed to neutralize any excess of acid by the addition of carbonate of lime, or other suitable alkaline carbonate. I find that for the purpose of my invention it is preferable to employ "lump carbonate of lime" more particularly that which is known as the "grey" stone, or more dense variety. Having removed the acidity in the manner above stated it is advantageous to add a small quantity of finely powdered animal charcoal to the sirup. I then rouse the mixture and pass it through the charcisterns in the usual way. The addition of the powdered animal charcoal as above indicated completes the neutralization in a manner that cannot be equaled by the use of carbonate of lime alone owing to the action of the free acid still left in the sirup upon the carbonate contained in the animal charcoal. The purification having been satisfactorily completed, I evaporate the product *in vacuo* to the required consistency.

Having now described my invention, what I claim as new, and desire to secure by Letters Patent, is—

The process of manufacturing brewing sirup containing a large proportion of dextrine together with a very much larger proportion of directly fermentable carbo-hydrate and free or practically free from gallisin, said process consisting in mixing liquid starch sugar of suitable quality and in suitable proportion with good raw cane sugar or other sirup containing crystallizable (cane) sugar in suitable quantity melting the mixture diluting with water and filtering through charcoal, inverting the cane sugar by the addition of a suitable proportion of sulphuric acid and simultaneously destroying the gallisin neutralizing by means of carbonate of lime or the like, completing the neutralization by the addition to the liquid of powdered animal charcoal and subsequently filtering the product through char or other suitable medium to make it ready for the market.

In witness whereof I have hereunto set my hand in presence of two witnesses.

LEOPOLD ISIDORE NEUMANN NORMAN.

Witnesses:
H. W. GURSON,
E. J. HAY.